(12) United States Patent
Nory et al.

(10) Patent No.: US 12,082,210 B2
(45) Date of Patent: Sep. 3, 2024

(54) SCELL MANAGEMENT FOR CA

(71) Applicant: Telefonaktiebolaget LM Ericsson (publ), Stockholm (SE)

(72) Inventors: Ravikiran Nory, San Jose, CA (US); Ajit Nimbalker, Fremont, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 230 days.

(21) Appl. No.: 17/421,900

(22) PCT Filed: Jan. 10, 2020

(86) PCT No.: PCT/EP2020/050609
§ 371 (c)(1),
(2) Date: Jul. 9, 2021

(87) PCT Pub. No.: WO2020/144370
PCT Pub. Date: Jul. 16, 2020

(65) Prior Publication Data
US 2022/0116976 A1    Apr. 14, 2022

Related U.S. Application Data

(60) Provisional application No. 62/791,570, filed on Jan. 11, 2019.

(51) Int. Cl.
| | | |
|---|---|---|
| *H04W 76/28* | (2018.01) | |
| *H04L 5/00* | (2006.01) | |
| *H04W 72/23* | (2023.01) | |

(52) U.S. Cl.
CPC ............. *H04W 72/23* (2023.01); *H04L 5/001* (2013.01); *H04L 5/0051* (2013.01);
(Continued)

(58) Field of Classification Search
CPC ...... H04W 72/23; H04W 76/28; H04L 5/001; H04L 5/0051; H04L 5/0057; H04L 5/0098; Y02D 30/70
See application file for complete search history.

(56) References Cited

U.S. PATENT DOCUMENTS 10,237,858 B2 *  3/2019  Lee ................... H04L 5/0055
10,700,845 B2 *  6/2020  Dinan .................. H04W 72/21
(Continued)

FOREIGN PATENT DOCUMENTS

| CN | 102769903 A | 11/2012 |
|---|---|---|
| EP | 2698931 A2 | 2/2014 |

(Continued)

OTHER PUBLICATIONS

Indian Examination Report dated Mar. 15, 2022 for Application No. 202117029651, consisting of 6 pages.
(Continued)

*Primary Examiner* — Julio R Perez
(74) *Attorney, Agent, or Firm* — Weisberg I.P. Law, P.A.

(57) ABSTRACT

Methods and apparatuses are disclosed for secondary cell (Scell) management. In one embodiment, a wireless device is configured to receive a first command, via a Medium Access Control, MAC, layer signaling, the first command being an activation/deactivation command; perform a first set of actions for at least one Scell of one or more Scells based at least in part on the first command; receive a second command, via a physical downlink control channel, PDCCH, signaling on a primary cell, Pcell; and perform a second set of actions for the at least one Scell of the one or more Scells based at least in part on the second command, the first set of actions and the second set of actions including starting or stopping PDCCH monitoring for the at least one
(Continued)

Scell. In one embodiment, a network node is configured to send the first command and the second command.

25 Claims, 10 Drawing Sheets

(52) U.S. Cl.
CPC .......... *H04L 5/0057* (2013.01); *H04L 5/0098* (2013.01); *H04W 76/28* (2018.02)

(56) References Cited

U.S. PATENT DOCUMENTS

| | | | |
|---|---|---|---|
| 11,490,334 B2* | 11/2022 | Zhou | H04L 1/1614 |
| 11,546,853 B2* | 1/2023 | Agiwal | H04W 76/27 |
| 2012/0257601 A1 | 10/2012 | Kim et al. | |
| 2014/0064170 A1 | 3/2014 | Seo | |
| 2017/0374665 A1 | 12/2017 | Lee et al. | |
| 2020/0053725 A1* | 2/2020 | Kim | H04W 56/0005 |
| 2022/0116976 A1* | 4/2022 | Nory | H04W 76/28 |
| 2022/0217559 A1* | 7/2022 | Nory | H04L 1/1812 |

FOREIGN PATENT DOCUMENTS

| | | |
|---|---|---|
| WO | 2012119626 A1 | 9/2012 |
| WO | 2014007593 A1 | 1/2014 |
| WO | 2016072495 A1 | 5/2016 |

OTHER PUBLICATIONS

International Search Report and Written Opinion dated Mar. 31, 2020 for International Application No. PCT/EP2020/050609 filed Jan. 10, 2020, consisting of 15-pages.
3GPP TSG RAN WG1 Meeting #95 R1-1812421; Title: On adaptation aspects for NR UE power consumption reduction; Agenda Item 7.2.9.2.1; Source: ZTE; Document for: Discussion and Decision; Data and Location: Nov. 12-16, 2018, Spokane, USA, consisting of 10-pages.
3GPP TSG-RAN 2 Meeting #99 R1-1707787; Title: Fast SCell activation for enhanced CA utilization; Agenda Item 9.9.2; Source: Qualcomm Incorporated; Document for: Discussion and Decision; Data and Location: Aug. 21-25, 2017, Berlin, Germany, consisting of 5-pages.
3GPP TS 38.213 V15.3.0; 3rd Generation Partnership Project; Technical Specification Group Radio Access Network; NR; Physical layer procedures for control (Release 15), Sep. 2018, consisting of 101-pages.
3GPP TS 38.133 V15.3.0; 3rd Generation Partnership Project; Technical Specification Group Radio Access Network; NR; Requirements for support of radio resource management (Release 15), Sep. 2018, consisting of 136-pages.
Chinese Office Action and English summary dated Jul. 8, 2023 for Application No. 202080008614.8, consisting of 10 pages.
Japanese Office Action and English Summary dated Sep. 22, 2022 for Application No. 2021-538070, consisting of 5 pages.
3GPP TSG-RAN2 Meeting #100 R2-1712255; Title: Fast SCell activation for enhanced CA utilization; Agenda Item: 9.9.2; Source: Qualcomm Inc, AT&T; Document for: Discussion and Decision; Location and Date: Reno, USA Nov. 27, 2017-Dec. 1, 2017, consisting of 9 pages.
European Search Report dated Mar. 20, 2023 for Application No. 22211725.1, consisting of 10 pages.
Korean Office Action and English Translation dated Jun. 21, 2024 for Application No. 10-2021-702557, consisting of 9 pages.
3GPP TSG-RAN2 Meeting #99bis R2-1710138; Title: Fast SCell activation for enhanced CA utilization; Agenda Item: 9.9.2; Source: Qualcomm Incorporated; Document for: Discussion and Decision; Location and Date: Prague, Czech Republic, Oct. 9-13, 2017, consisting of 8 pages.

* cited by examiner

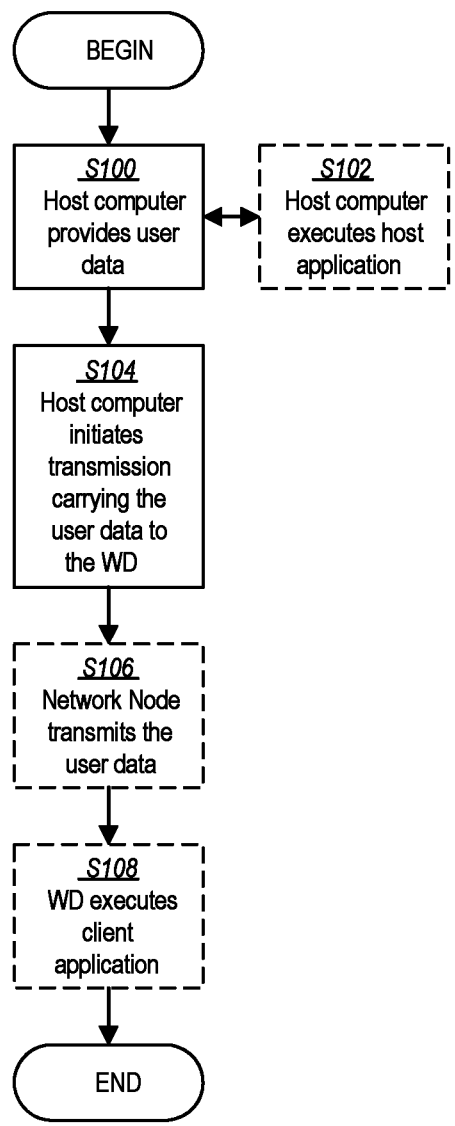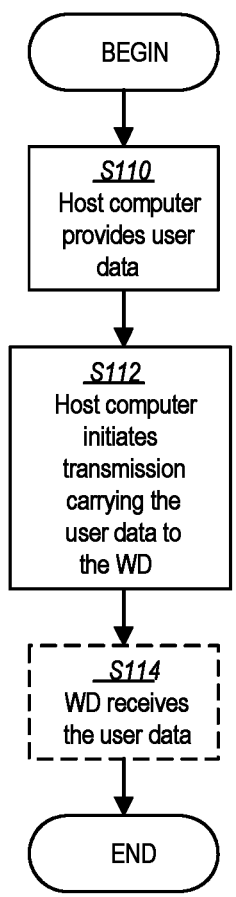
FIG. 4
FIG. 5

SCELL MANAGEMENT FOR CA

CROSS-REFERENCE TO RELATED APPLICATIONS

This application is a Submission Under 35 U.S.C. § 371 for U.S. National Stage Patent Application of International Application No.: PCT/EP2020/050609, filed Jan. 10, 2020 entitled "SCELL MANAGEMENT FOR CA," which claims priority to U.S. Provisional Application No. 62/791,570, filed Jan. 11, 2019, entitled "FAST SCELL MANAGEMENT FOR NR-NR CA," the entireties of both of which are incorporated herein by reference.

TECHNICAL FIELD

The present disclosure relates to wireless communications, and in particular, to secondary cell (Scell) management for carrier aggregation (CA).

BACKGROUND

Carrier Aggregation is generally used in 3$^{rd}$ Generation Partnership Project (3GPP) New Radio (NR) (also referred to as 5G) and Long Term Evolution (LTE systems) to improve wireless device (WD) (e.g., user equipment or UE) transmit receive data rates. With carrier aggregation (CA), the WD typically operates initially on single serving cell called a primary cell (Pcell). The Pcell is operated on a component carrier in a frequency band. The WD is then configured by the network (e.g., network node) with one or more secondary serving cells (Scell(s)). Each Scell can correspond to a component carrier (CC) in the same frequency band (intra-band CA) or different frequency band (inter-band CA) from the frequency band of the CC corresponding to the Pcell. For the WD to transmit/receive data on the Scell(s) (e.g., by receiving downlink shared channel (DL-SCH) information on a physical downlink shared channel (PDSCH) or by transmitting uplink shared channel (UL-SCH) information on a physical uplink shared channel (PUSCH)), the Scell(s) is activated by the network (e.g., network node). The Scell(s) can also be deactivated and later reactivated as needed via activation/deactivation signaling.

FIG. 1 illustrates Scell activation/deactivation related procedures specified for New Radio (NR) Release 15 (Rel-15). As shown in FIG. 1, except for channel state information (CSI) reporting, the WD is allowed to start performing other 'activation related actions' (e.g., physical downlink control channel (PDCCH) monitoring for Scell, physical uplink control channel/sounding reference signal (PUCCH/SRS) transmission on the Scell) within a specified range of slots. i.e., after the minimum required activation delay (specified in third generation partnership project (3GPP) technical specification (TS) 38.213) and before the maximum allowed activation delay (specified in 3GPP TS 38.133). CSI reporting for the Scell starts (and stops) with a fixed slot offset after receiving the activation (deactivation) command.

Below are examples of the minimum required activation delay and maximum allowed activation delay for some example conditions:

Minimum required activation delay is k1+3 ms+1 slots as, for example, specified in 3GPP such as 3GPP TS 38.213 sub clause 4.3. Assuming 30 kHz numerology for Pcell, and k1=4, this would be 5.5 ms.

Maximum allowed activation delay depends on conditions described in, for example, 3GPP such as 3GPP TS 38.133 sub clause 8.3.2 and the value varies based on WD measurement configuration, operating frequency range and other aspects.

Assuming T_HARQ in 3GPP TS 38.133 has similar meaning as k1 in, for example, 3GPP such as 3GPP TS 38.213, and assuming 'known Scell' with Scell measurement cycle is equal to or smaller than [160 milliseconds (ms)], and T_csi_reporting=4slots:

For frequency 1 (FR1) and 30 kHz subcarrier spacing (SCS),
If synchronization signal/physical broadcast channel (SS/PBCH) Block Measurement Time Configuration (SMTC) periodicity 5 ms, the delay cannot be larger than (T_HARQ=4slots)+(T_act_time=5 ms+5 ms)+(T_csi_report=4slots)=14 ms; and
SMTC periodicity 20 ms, the delay cannot be larger than (T_HARQ=4slots)+(T_act_time=5 ms+20 ms)+(T_csi_report=4slots)=29 ms.

For frequency 2 (FR2), assuming this is the first Scell being activated in that FR2 band,
SMTC periodicity 5 ms, the delay is 4slots+5 ms+TBD*5 ms+4slots=6 ms+X*5 ms;
SMTC periodicity 20 ms, the delay is 4slots+5 ms+TBD*20 ms+4slots=6 ms+X*20 ms; and
X>1 is to be determined (TBD) in current Rel-15 specifications.

For other conditions, e.g., Scell is not 'known' and longer SMTC periodicities, the maximum allowed activation delay may be much longer than the values in the above example.

SUMMARY

Some embodiments advantageously provide methods and apparatuses for fast secondary cell (Scell) management for carrier aggregation (CA).

In one embodiment, a method for a network node includes sending, via higher layer signaling, a first command, the first command being an activation/deactivation command for at least one secondary cell (Scell); and determining and sending, via layer 1 signalling, a second command, the second command being different from the first command and the second command indicating at least one action to be performed by the WD for the at least one Scell.

In another embodiment, a method for a WD includes receiving, via higher layer signaling, a first command, the first command being an activation/deactivation command for at least one secondary cell (Scell); receiving, via layer 1 signalling, a second command, the second command being different from the first command; and performing at least one action associated with the at least one Scell based on the second command.

According to one aspect of the present disclosure, a method implemented a wireless device, WD, configured to operate on one or more secondary cells, Scells, is provided. The method includes receiving a command, via a physical downlink control channel, PDCCH, signaling. The method further includes performing a set of actions for at least one S cell of the one or more Scells upon receiving the command via PDCCH signaling, the set of actions including starting or stopping PDCCH monitoring for the at least one Scell In some embodiments of this aspect, the method further includes the step of receiving an activation command via Medium Access Control, MAC, layer signaling; and performing (S140) a set of actions for the at least one SCell upon receiving the command via MAC layer signaling different from the set of actions performed upon receiving the command via PDCCH signaling.

The set of actions performed upon receiving the command via MAC layer signaling may further include starting or stopping channel state information, CSI, reporting for the at least one Scell. In some embodiments of this aspect, the set of actions performed upon receiving the MAC layer signaling further includes starting or stopping sounding reference signal, SRS, transmission on the at least one Scell. In some embodiments of this aspect, the set of actions performed upon receiving the MAC layer signaling does not include starting or stopping CSI reporting for the at least one Scell. In some embodiments, the command received via PDCCH signaling is a physical layer, L1, command. In some embodiments, the method comprises receiving the command via PDCCH signaling in DCI on a Pce.ll. In some embodiments of this aspect, receiving the command via PDCCH signaling further includes receiving N bits in downlink control information, DCI, of the PDCCH on the Pcell, each bit of the N bits corresponding to one Scell and N being a number of the one or more Scells configured for the WD.

In some embodiments of this aspect, performing the set of actions upon receiving the command via MAC layer signaling further includes performing the set of actions after a first delay, D1, from when that command is received; and performing the set of actions upon receiving the command via PDCCH signaling further includes performing the set of actions after a second delay, D2, from when that command is received, the second delay being smaller than the first delay. In some embodiments of this aspect, receiving the command via PDCCH signaling further includes receiving the command as a wake-up signal. In some embodiments of this aspect, the method further includes determining whether to monitor the PDCCH on the Scell based at least in part on both the received commands. In some embodiments of this aspect, the method further includes determining whether to report CSI for the Scell based at least in part on a state indicated by the command received via MAC layer signaling and regardless of a state indicated by the command received by PDCCH signaling. In some embodiments of this aspect, upon reception of a particular state indicated by the command received by PDCCH signaling, the wireless device continues to follow prior behavior with respect to set of actions indicated by that command received by PDCCH signaling. According to yet another aspect of the present disclosure, a method implemented in a network node configured to configure a wireless device, WD, to operate on one or more secondary cells, Scells, is provided. The method includes sending a command, via a physical downlink control channel, PDCCH, signaling indicating a set of actions to be performed by the WD on at least one Scell of the one or more Scells, the set of actions including starting or stopping PDCCH monitoring for the at least one Scell.

In some embodiments of this aspect, the method further comprises sending an activation command via Medium Access Control, MAC, layer signaling indicating a set of actions for the at least one SCell different from the set of actions indicated by the command sent via PDCCH signaling. The set of actions indicated by the command sent via MAC layer signaling may further include starting or stopping channel state information, CSI, reporting for the at least one Scell. In some embodiments of this aspect, the set of actions indicated by the command sent via MAC layer signaling further includes starting or stopping sounding reference signal, SRS, transmission on the at least one Scell. In some embodiments of this aspect, the set of actions does not include starting or stopping CSI reporting for the at least one Scell. The command sent via PDCCH signaling can be a physical layer, L1, command. The method may comprise sending the command via PDCCH signaling in DCI on a Pcell. In some embodiments of this aspect, sending the command via PDCCH signaling further includes sending N bits in downlink control information, DCI, of the PDCCH on the Pcell, each bit of the N bits corresponding to one Scell and N being a number of the one or more S cells configured for the WD.

In some embodiments of this aspect, the set of actions indicated by the command sent via MAC layer signaling is to be performed by the WD after a first delay, D1, from when the command is received by the WD; and the set of actions indicated by the command sent via PDCCH signaling is to be performed by the WD after a second delay, D2, from when the that command is received by the WD, the second delay being smaller than the first delay. In some embodiments of this aspect, sending the command via PDCCH signaling further includes sending the command as a wake-up signal. In some embodiments of this aspect, a combination of both commands indicates whether the WD is to monitor the PDCCH on the Scell. In some embodiments of this aspect, a state indicated by the command received via MAC layer signaling indicates whether the WD is to report CSI for the Scell, regardless of a state indicated by the command received via PDCCH signaling. In some embodiments of this aspect, the method further includes receiving signaling on the at least one Scell based at least in part on at least one of the command received via MAC layer signaling and the command received via PDCCH signaling.

According to another aspect of the present disclosure, a wireless device, WD, configured to operate on one or more secondary cells, Scells, is provided. The WD is configured to receive a command, via a physical downlink control channel, PDCCH, signaling; and perform a set of actions for at least one Scell of the one or more Scells upon receiving the command via PDCCH signaling. The set of actions including starting or stopping PDCCH monitoring for the at least one Scell.

According to some aspects. the WD includes processing circuitry. The processing circuitry is configured to cause the WD to perform the methods disclosed herein.

According to another aspect of the present disclosure, a network node configured to configure a wireless device, WD, to operate on one or more secondary cells, Scells, is provided. The network node (16) is configured to send a command, via a physical downlink control channel, PDCCH, signaling indicating a set of actions to be performed by the WD (22) on at least one Scell of the one or more Scells. The set of actions including starting or stopping PDCCH monitoring for the at least one S cell.

According to another aspect, the network node includes processing circuitry. The processing circuitry is configured to cause the network node to perform the methods disclosed herein.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 is a flowchart illustrating exemplary methods implemented in a communication system including a host computer, a network node and a wireless device for executing a client application at a wireless device according to some embodiments of the present disclosure;

FIG. 5 is a flowchart illustrating exemplary methods implemented in a communication system including a host computer, a network node and a wireless device for receiving user data at a wireless device according to some embodiments of the present disclosure;

DETAILED DESCRIPTION

Figure 1:
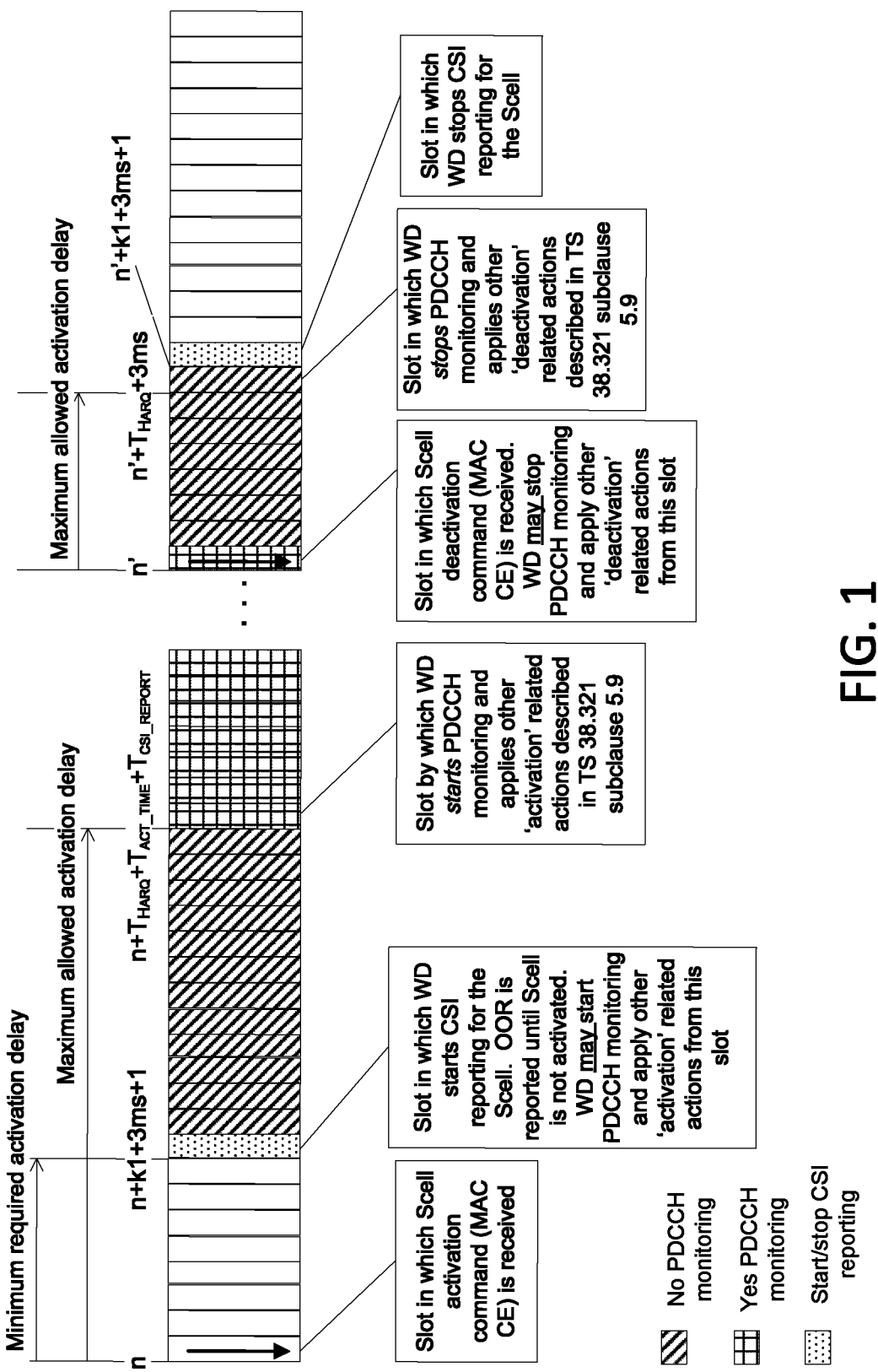
FIG. 1 illustrates an example of S cell activation/deactivation related procedures specified for Rel-15 NR.

The 3GPP Release-15 (Rel-15) CA activation command is sent in a medium access control (MAC) control element (CE) and the minimum required activation delay is ~5 ms for a typical case. This is relatively slow compared to other NR procedures. Also, the maximum allowed activation delays are relatively long, compared to other NR procedures. Due to such long delays, it is riskier for the network (e.g., network node) to frequently deactivate the Scell since bringing the WD back to Scell activated state can take a minimum of ~5 ms to a maximum allowed value of tens or hundreds of milliseconds depending on the specific scenario and WD implementation. If the Scell operations are not stopped whenever possible, WD power consumption may be unnecessarily increased.

The disclosure herein provides mechanisms for faster Scell operation when compared to existing LTE or NR CA approaches. This may be achieved by introducing a new layer 1 (L1) (physical layer) on/off commands in addition to the existing MAC CE-based higher layer signaling. The MAC CE-based Scell activation/deactivation commands may control a first set of WD procedures/actions associated with the Scell (e.g., a) CSI reporting for Scell, b) PDCCH monitoring for SCell, c) PUCCH/SRS transmissions on the SCell). The L1 on/off commands may control a second set WD procedures/actions (e.g., a) PDCCH monitoring for SCell, b) PUCCH/SRS transmissions on the SCell). While the WD can receive both MAC CE-based activation/deactivation commands and L1-based on/off commands, the time used by the WD for applying the second set of actions (associated with L1 on/off commands) may be smaller than the time needed for applying the first set of actions (associated with the MAC CE-based signaling).

Thus, some embodiments of this disclosure provide mechanisms to enable the network (e.g., network node) to control Scell procedures more aggressively by e.g., sending frequent L1 on/off commands while continuing to use the MAC CE-based activation/deactivation mechanism relatively infrequently. From a WD perspective, power savings can be achieved with this mechanism when compared to legacy approaches of only using MAC CE-based activation/deactivation commands.

Before describing in detail exemplary embodiments, it is noted that the embodiments reside primarily in combinations of apparatus components and processing steps related to fast secondary cell (Scell) management for carrier aggregation (CA). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

In some embodiments, the term "higher layer" is used and, in some embodiments may include MAC CE signalling and/or RRC signalling. In some embodiments, "higher layer" may mean signalling at a layer higher than a physical (e.g., layer 1/L1) layer. In some embodiments, the term higher layer may indicate other types of communications, as well.

Any two or more embodiments described in this disclosure may be combined in any way with each other.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

In some embodiments, the term "command" is used herein. In some embodiments, the term command may be used to indicate configuration and/or control information (e.g., to control, command and/or configure a WD or otherwise instruct or request that the WD perform a certain action). In some embodiments, control or command information on one or more resources may be considered to be transmitted in a message having a specific format. A message may comprise or represent bits representing payload information and coding bits, e.g., for error coding.

Receiving (or obtaining) control or command information may comprise receiving one or more control information messages (e.g., an RRC monitoring parameter or DCI). It may be considered that receiving control signaling comprises demodulating and/or decoding and/or detecting, e.g. blind detection of, one or more messages, in particular a message carried by the control signaling, e.g. based at least in part on an assumed set of resources, which may be searched and/or listened for the control information. It may be assumed that both sides of the communication are aware of the configurations, and may determine the set of resources, e.g. based at least in part on the reference size.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Configuring/controlling/commanding a radio node, in particular a terminal or user equipment or the WD, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources, or e.g., configuration for performing certain measurements on certain subframes or radio resources. A radio node may configure itself, e.g., based at least in part on configuration data received from a network or network node. A network node may use, and/or be adapted to use, its circuitry/ies for configuring. Allocation information may be considered a form of configuration data. Configuration data may comprise and/or be represented by configuration information, and/or one or more corresponding indications and/or message/s.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
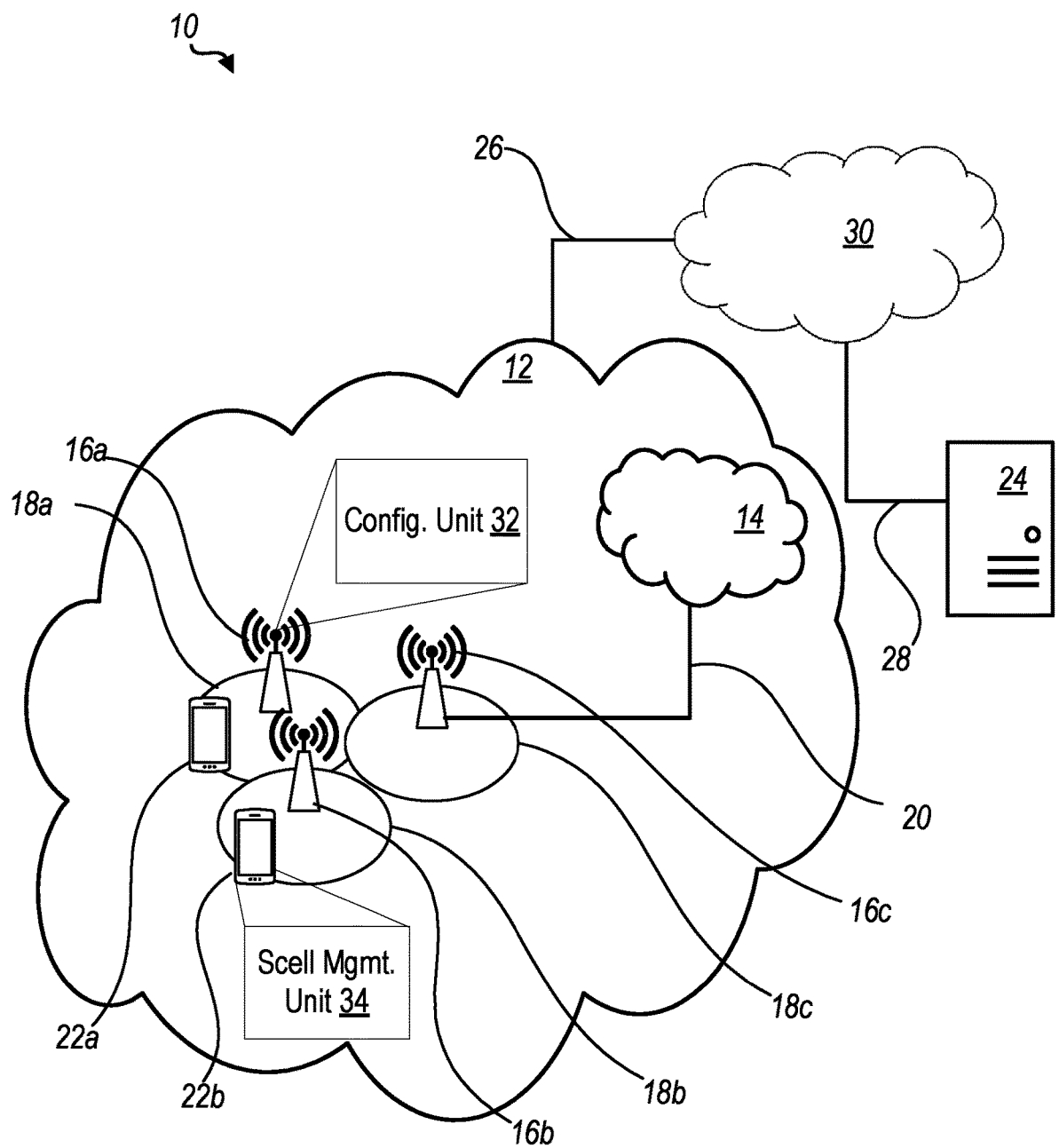
FIG. 2 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32 which is configured to cause the network node 16 to perform the methods performed by the network node 16 disclosed herein.

In some embodiments, the configuration unit 32 is configured to send, via higher layer signaling, a first command, the first command being an activation/deactivation command for at least one secondary cell (Scell); and determine and send, via layer 1 signalling, a second command, the second command being different from the first command and the second command indicating at least one action to be performed by the WD 22 for the at least one Scell. The at least one action can include physical downlink control channel (PDCCH) monitoring.

A wireless device 22 is configured to include a Scell management unit 34 which is configured to cause the wireless device 22 to perform the methods performed by the wireless device disclosed herein.

In some embodiments, Scell management unit 34 is configured to receive, via higher layer signaling, a first command, the first command being an activation/deactivation command for at least one secondary cell (Scell); receive, via layer 1 signalling, a second command, the second command being different from the first command; and perform at least one action associated with the at least one Scell based at least in part on the second command. The at least one action can include physical downlink control channel (PDCCH) monitoring.

Example implementations, in accordance with an embodiment, of the WD 22, network node 16 and host computer 24 discussed in the preceding paragraphs will now be described with reference to FIG. 2 and FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68, e.g. by processor 70. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16 (such as the processes described with reference to FIGS. 8 and 12 other figures). For example, processing circuitry 68 of the network node 16 may include configuration unit 32 configured to send, via higher layer signaling, a first command, the first command being an activation/deactivation command for at least one secondary cell (Scell); and determine and send, via layer 1 signalling, a second command, the second command being different from the first command and the second command indicating at least one action to be performed by the WD 22 for the at least one S cell.

In some embodiments, the first command is configured to command the WD 22 to start/stop at least one of a first set of actions; and the second command is configured to command the WD 22 to start/stop at least one of a second set of actions, the second set of actions being different from the first set of actions. In some embodiments, one or more of: the first set of actions includes channel state information (CSI) reporting for the at least one Scell; the second set of actions does not include CSI reporting for the at least one Scell; and one or both of the first and second set of actions includes one or more of: physical downlink control channel (PDCCH) monitoring for the at least one Scell, physical uplink control channel (PUCCH) transmission on the at least one Scell, and sounding reference signal (SRS) transmission on the at least one Scell. In some embodiments, one or more of: the second command is sent on a physical downlink control channel (PDCCH); the second command is sent in downlink control information (DCI); and the second command includes at least one of an on/off status, an activate/deactivate field, an offset and a timer value, for each of the at least one Scell. The communication system 10 further includes the WD 22 already referred to.

The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22 (such as the processes described with reference to FIGS. 9 and 11 other figures). For example, the processing circuitry 84 of the wireless device 22 may include a Scell management unit 34 configured to receive, via higher layer signaling, a first command, the first command being an activation/deactivation command for at least one secondary cell (Scell); receive, via layer 1 signalling, a second command, the second command being different from the first command; and perform at least one action associated with the at least one Scell based at least in part on the second command.

In some embodiments, the processing circuitry 84 is further configured to start/stop at least one of a first set of actions based at least in part on the first command; and start/stop at least one of a second set of actions based at least in part on the second command, the second set of actions being different from the first set of actions. In some embodiments, one or more of: the first set of actions includes channel state information (CSI) reporting for the at least one Scell; the second set of actions does not include CSI reporting for the at least one Scell; and one or both of the first and second set of actions includes one or more of: physical downlink control channel (PDCCH) monitoring for the at least one Scell, physical uplink control channel (PUCCH) transmission on the at least one Scell, and sounding reference signal (SRS) transmission on the at least one Scell. In some embodiments, one or more of: the second command is received on a physical downlink control channel; the second command is included in downlink control information (DCI); and the second command includes at least one of an on/off status, an activate/deactivate field, an offset and a timer value, for each of the at least one Scell.

Figure 3:
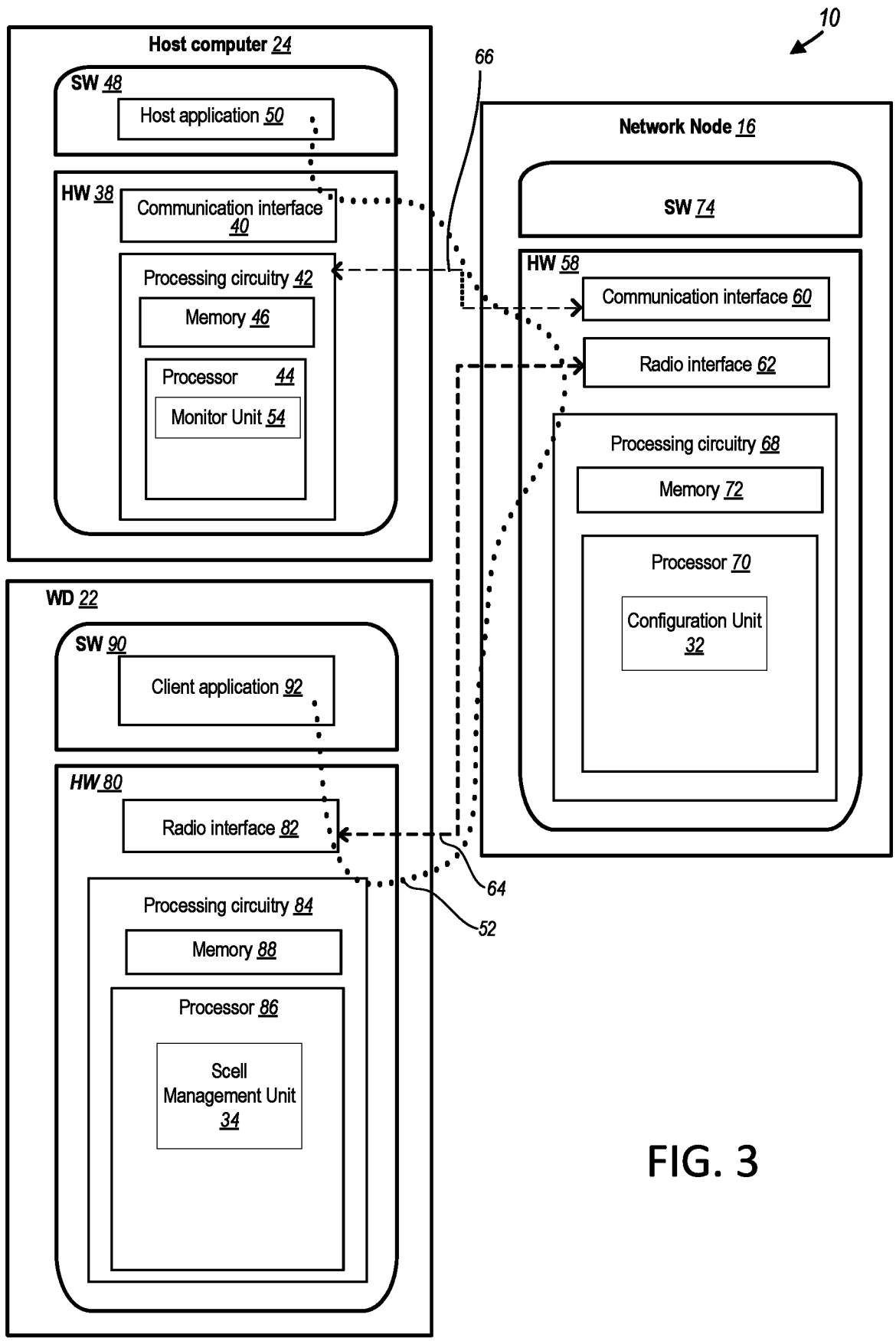
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as configuration unit 32, and Scell management unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 4 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 6:
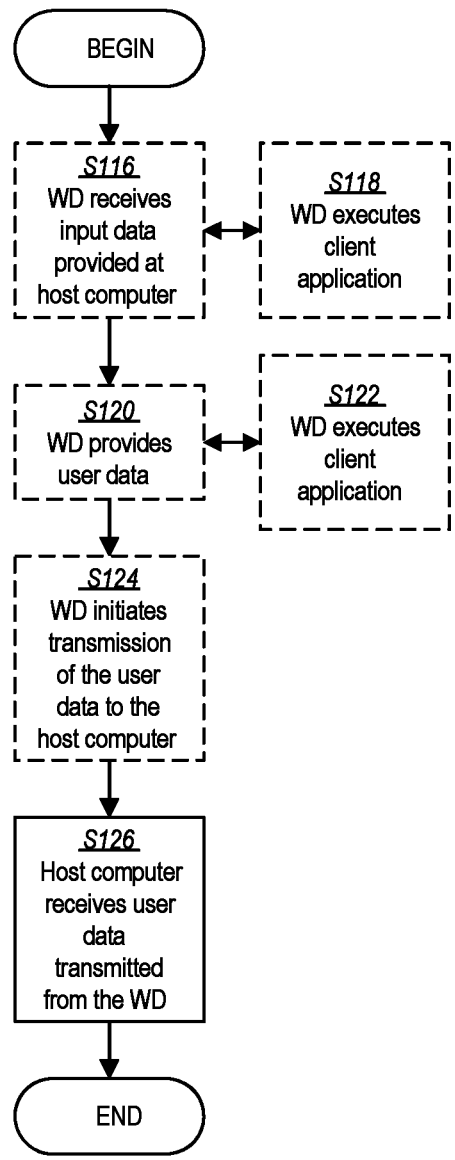
FIG. 6 is a flowchart illustrating exemplary methods implemented in a communication system including a host computer, a network node and a wireless device for receiving user data from the wireless device at a host computer according to some embodiments of the present disclosure.

FIG. 6 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 7:
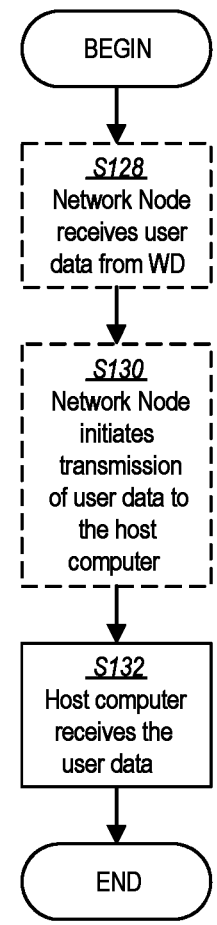
FIG. 7 is a flowchart illustrating exemplary methods implemented in a communication system including a host computer, a network node and a wireless device for receiving user data at a host computer according to some embodiments of the present disclosure.

FIG. 7 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
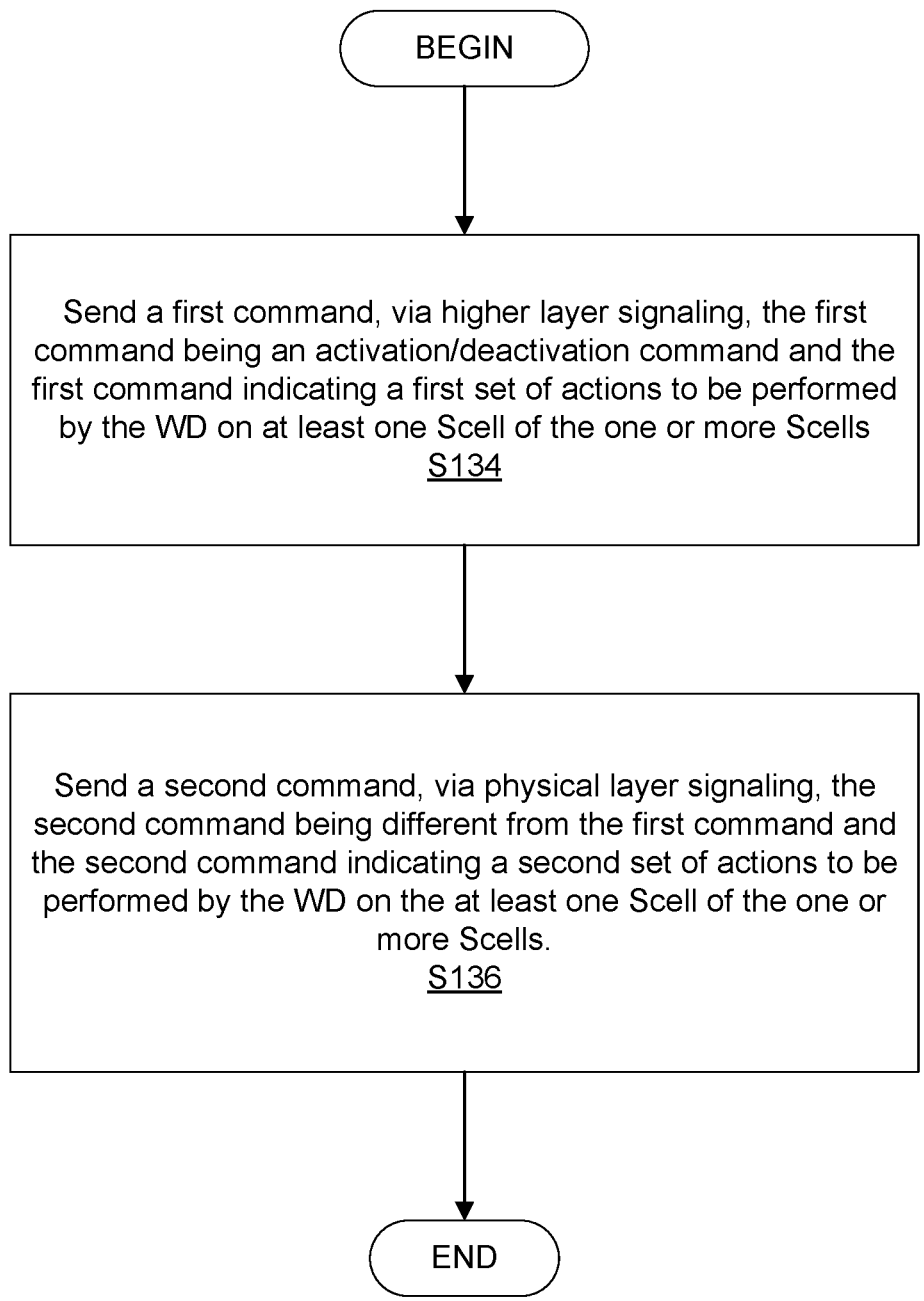
FIG. 8 is a flowchart of an exemplary process in a network node according to some embodiments of the present disclosure.

FIG. 8 is a flowchart of an exemplary process in a network node 16 according to some embodiments of the present disclosure. One or more Blocks and/or functions and/or methods performed by the network node 16 may be performed by one or more elements of network node 16 such as by configuration unit 32 in processing circuitry 68, processor 70, radio interface 62, communication interface 60, etc. according to the example method. The example method includes sending (Block S134), such as via configuration unit 32, processing circuitry 68, processor 70, radio interface 62, and/or communication interface 60, a first command, via higher layer signaling, the first command being an activation/deactivation command and the first command indicating a first set of actions to be performed by the WD 22 on at least one S cell of the one or more Scells. The higher layer signaling may be MAC layer signaling. The method further includes sending (Block S136), such as via configuration unit 32, processing circuitry 68, processor 70, radio interface 62, and/or communication interface 60, a second command, via physical layer signaling. The second command may be sent via PDCCH signaling. It may signaled on a primary cell, Pcell. The second command is different from the first command and the second command indicates a second set of actions to be performed by the WD 22 on the at least one Scell of the one or more Scells. The second set of actions may include starting or stopping PDCCH monitoring for the at least one Scell.

In some embodiments, the first set of actions includes starting or stopping, such as via configuration unit 32, processing circuitry 68, processor 70, radio interface 62, and/or communication interface 60, channel state information, CSI, reporting for the at least one S cell. In some embodiments, the first set of actions further includes starting or stopping, such as via configuration unit 32, processing circuitry 68, processor 70, radio interface 62, and/or communication interface 60, sounding reference signal, SRS, transmission on the at least one S cell. In some embodiments, the second set of actions does not include starting or stopping CSI reporting for the at least one Scell.

In some embodiments, sending the second command further includes sending, such as via configuration unit 32, processing circuitry 68, processor 70, radio interface 62, and/or communication interface 60, N bits in downlink control information, DCI, of the PDCCH on the Pcell, each bit of the N bits corresponding to one Scell and N being a number of the one or more Scells configured for the WD 22. In some embodiments, the first set of actions is to be performed by the WD 22 after a first delay, D1, from when the first command is received by the WD 22; and the second set of actions is to be performed by the WD 22 after a second delay, D2, from when the second command is received by the WD 22, the second delay being smaller than the first delay. In some embodiments, sending the second command further includes sending, such as via configuration unit 32, processing circuitry 68, processor 70, radio interface 62, and/or communication interface 60, the second command as a wake-up signal. In some embodiments, a combination of both the first command and the second command indicates whether the WD 22 is to monitor the PDCCH on the Scell. In some embodiments, a value of the first command indicates whether the WD 22 is to report CSI for the Scell, regardless of a value of the second command. In some embodiments, the method further includes receiving signaling, such as via configuration unit 32, processing circuitry 68, processor 70, radio interface 62, and/or communication interface 60, on the at least one Scell based at least in part on at least one of the first command and the second command.

In some embodiments, the example method includes sending, via higher layer signaling by e.g., radio interface 62, a first command, the first command being an activation/deactivation command for at least one secondary cell (Scell). The method includes determining, such as by configuration unit 32 in processing circuitry 68, and sending, via layer 1 signalling such as by radio interface 62, a second command, the second command being different from the first command and the second command indicating at least one action to be performed by the WD for the at least one Scell.

In some embodiments, the first command is configured, such as by configuration unit 32 in processing circuitry 68, to command the WD 22 to start/stop at least one of a first set of actions; and the second command is configured to command the WD 22 to start/stop at least one of a second set of actions, the second set of actions being different from the first set of actions. In some embodiments, one or more of: the first set of actions includes channel state information (CSI) reporting for the at least one Scell; the second set of actions does not include CSI reporting for the at least one Scell; and one or both of the first and second set of actions includes one or more of: physical downlink control channel (PDCCH) monitoring for the at least one Scell, physical uplink control channel (PUCCH) transmission on the at least one Scell, and sounding reference signal (SRS) transmission on the at least one Scell. In some embodiments, one or more of: the second command is sent, such as via radio interface 62, on a physical downlink control channel; the second command is sent, such as via radio interface 62, in downlink control information (DCI); and the second command includes at least one of an on/off status, an activate/deactivate field, an offset and a timer value, for each of the at least one Scell.

Figure 9:
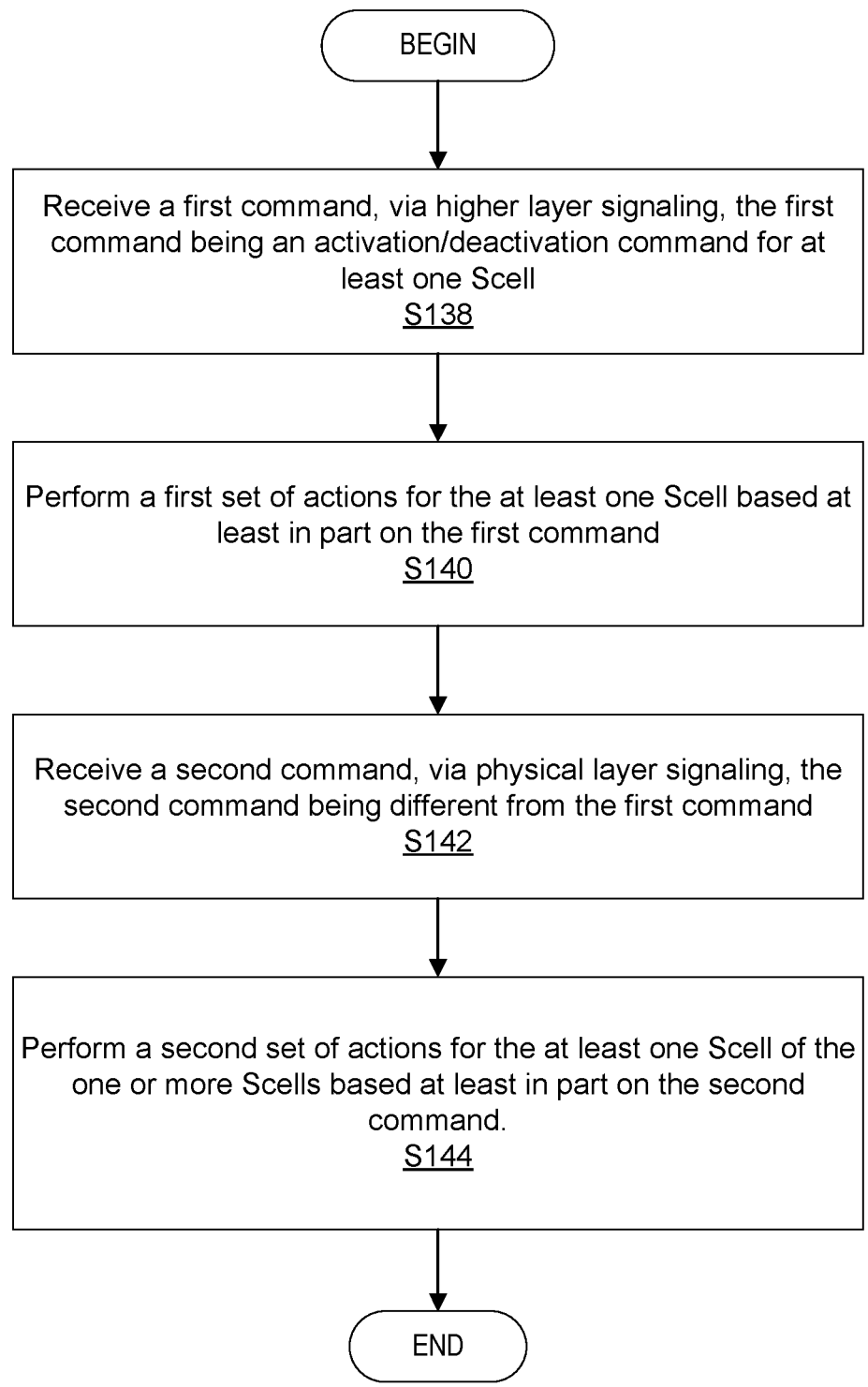
FIG. 9 is a flowchart of an exemplary process in a wireless device according to some embodiments of the present.

FIG. 9 is a flowchart of an exemplary process in a wireless device 22 according to some embodiments of the present disclosure. One or more Blocks and/or functions and/or methods performed by WD 22 may be performed by one or more elements of WD 22 such as by Scell management unit 34 in processing circuitry 84, processor 86, radio interface 82, etc., according to the example method. The example method includes receiving (Block S138), such as via Scell management unit 34, processing circuitry 84, processor 86 and/or radio interface 82, a first command, via higher layer signaling, the first command being an activation/deactivation command. The higher layer signaling may be MAC layer signaling. The method includes performing (Block S140), such as via Scell management unit 34, processing circuitry 84, processor 86 and/or radio interface 82, a first set of actions for at least one Scell of the one or more Scells based at least in part on the first command. The method includes receiving (Block S142), such as via Scell management unit 34, processing circuitry 84, processor 86 and/or radio interface 82, a second command, via physical layer signaling, the second command being different from the first command. The second command may be received via PDCCH signaling. It may be signaled on a Pcell. The method includes performing (Block S144), such as via Scell management unit 34, processing circuitry 84, processor 86 and/or radio interface 82, a second set of actions for the at least one Scell of the one or more Scells based at least in part on the second command. The second set of actions include starting or stopping PDCCH monitoring for the at least one Scell.

In some embodiments, the first set of actions further includes starting or stopping channel state information, CSI, reporting for the at least one Scell. In some embodiments, the first set of actions further includes starting or stopping sounding reference signal, SRS, transmission on the at least one Scell. In some embodiments, the second set of actions does not include starting or stopping CSI reporting for the at least one Scell. In some embodiments, receiving the second command further includes receiving, such as via Scell management unit 34, processing circuitry 84, processor 86 and/or radio interface 82, N bits in downlink control information, DCI, of the PDCCH on the Pcell, each bit of the N bits corresponding to one Scell and N being a number of the one or more Scells configured for the WD 22.

In some embodiments, performing the first set of actions further includes performing, such as via Scell management unit 34, processing circuitry 84, processor 86 and/or radio interface 82, the first set of actions after a first delay, D1, from when the first command is received. In some embodiments, performing the second set of actions further includes performing, such as via Scell management unit 34, processing circuitry 84, processor 86 and/or radio interface 82, the second set of actions after a second delay, D2, from when the second command is received, the second delay being smaller than the first delay. In some embodiments, receiving the second command further includes receiving, such as via Scell management unit 34, processing circuitry 84, processor 86 and/or radio interface 82, the second command as a wake-up signal.

In some embodiments, the method further includes determining, such as via Scell management unit 34, processing circuitry 84, processor 86 and/or radio interface 82, whether to monitor the PDCCH on the Scell based at least in part on both the received first command and the received second command. In some embodiments, the method further includes determining, such as via Scell management unit 34, processing circuitry 84, processor 86 and/or radio interface 82, whether to report CSI for the Scell based at least in part on a value of the first command and regardless of a value of the second command.

In some embodiments, the example method includes receiving, via higher layer signaling, such as by radio interface 82, a first command, the first command being an activation/deactivation command for at least one secondary cell (Scell). The method includes receiving, via layer 1 signalling, such as by radio interface 82, a second command, the second command being different from the first command. The method includes performing, such as by Scell management unit 34 in processing circuitry 84, processor 86, radio interface 82, etc., at least one action associated with the at least one Scell based at least in part on the second command.

In some embodiments, the method further includes starting/stopping, such as by Scell management unit 34 in processing circuitry 84, processor 86, radio interface 82, etc., at least one of a first set of actions based at least in part on the first command; and starting/stopping, such as by Scell management unit 34 in processing circuitry 84, processor 86, radio interface 82, etc., at least one of a second set of actions based at least in part on the second command, the second set of actions being different from the first set of actions. In some embodiments, one or more of: the first set of actions includes channel state information (CSI) reporting for the at least one Scell; the second set of actions does not include CSI reporting for the at least one Scell; and one or both of the first and second set of actions includes one or more of: physical downlink control channel (PDCCH) monitoring, such as by Scell management unit 34 in processing circuitry 84, processor 86, radio interface 82, etc., for the at least one Scell, physical uplink control channel (PUCCH) transmission, such as by radio interface 82, on the at least one Scell, and sounding reference signal (SRS) transmission, such as by radio interface 82, on the at least one Scell. In some embodiments, one or more of: the second command is received, such as via radio interface 82, on a physical downlink control channel; the second command is included in downlink control information (DCI); and the second command includes at least one of an on/off status, an activate/deactivate field, an offset and a timer value, for each of the at least one Scell.

Having described some embodiments for fast secondary cell (S cell) management for carrier aggregation (CA) above, a more detailed description of some of the embodiments are described below, which may be implemented by WD 22, network node 16 and/or host computer 24.

Embodiment 1

In an embodiment, a WD 22 communicates with the network 16 using a primary serving cell (Pcell). The WD 22 may also be configured with one or more secondary serving cells (Scell(s)). In some embodiments, the WD 22 receives a higher layer Scell activation/deactivation command. Upon reception of the higher layer activation/deactivation command, the WD 22 starts/stops performing a first set of actions. The first set of actions may include CSI reporting for the Scell. If the WD 22 receives the higher layer activation command in time slot n (where n may in some embodiments be any number), the WD 22 may apply the first set of actions starting with slot n+D1 (i.e., after an activation delay of D1 slots). The WD 22 may also receive a physical layer command (L1 command). Upon reception of the L1 on/off command, the WD 22 may start/stop performing a second set of actions. The second set of actions can include PDCCH monitoring for the Scell. The second set of actions can also include transmitting PUCCH/SRS on the Scell. The second set of actions may not include CSI reporting for the S cell. If the WD 22 receives the higher layer activation command in time slot n1, the WD 22 may apply the second set of actions starting with slot n1+D2 (i.e., after a delay of D2 slots). In some embodiments, the delay D2 is smaller than D1.

In the examples described herein, the term "slot" may be used for simplicity; however, it should be understood that other time or radio resources may be used instead.

The higher layer Scell activation/deactivation command can be received by the WD 22 in a MAC CE (MAC control element). The first set of actions can, in some examples, also include PDCCH monitoring for the Scell and/or transmitting PUCCH/SRS on the Scell.

The L1 command can be received by the WD 22, such as via radio interface 82, using a PDCCH.

In one example, the L1 command can be part of PDCCH downlink control information (DCI). One or more bits in the DCI can correspond to on/off status for one or more configured serving cells. For example, a PDCCH message can be a fall-back DCI format 0-0 or 1-0, and if the WD 22, such as via processing circuitry 84, is configured with N Scells, N bits in the DCI, with one bit corresponding to each Scell indicate the on/off state of each Scell. If the bit for an Scell indicates on state (e.g., set to 1), the WD 22 may start performing, such as via processing circuitry 84, the second set of actions for that Scell. If the bit indicates off state (e.g., set to 0), the WD 22 stops performing the second set of actions for that Scell. The DCI cyclic redundancy check (CRC) of the PDCCH can be scrambled by a radio network temporary identifier (RNTI) that is specific to L1 on/off commands. The RNTI can be different from C-RNTI/RA-RNTI/P-RNTI/SI-RNTI configured for the WD 22. In some embodiments, the L1 command can be received by the WD 22, such as via radio interface 82, on the primary serving cell.

In an example, in the L1 command DCI (e.g., with multiple bits per Scell for indicating the on/off state), a field value may correspond to 'no change' or 'reserved' or 'continue', where the WD 22 may continue to follow its prior behavior with respect to second set of actions. Such field values may be helpful in some cases e.g., where timers may be associated with reception of certain field value settings e.g., 'on state' triggering an 'on state' timer upon expiration of which the WD 22 returns to 'off state'.

In yet another example, a field value may correspond to 'deactivate' so that the L1 command DCI can further be used to deactivate an Scell.

In yet another example, the DCI can also include a field for a primary serving cell, and such field may be used to control the WD 22 PDCCH monitoring behavior on the primary serving cell.

In some embodiments, the L1 command can also include an offset k_offset (e.g., a certain number of slots). If the WD 22 receives the L1 command in slot n1, the WD 22 may apply the second set of actions starting from slot n1+k_offset. For example, if the WD 22 receives an L1 command indicating 'off', and k_offset=X for an Scell, the WD 22 may stop PDCCH monitoring on the Scell in response to receiving this 'off' command. Later, when the WD 22 receives another L1 command indicating 'on' for the Scell on slot n2, the WD 22 may expect to start PDCCH monitoring for the Scell from slot n2+X. Knowing X in advance, such as in this example embodiment, (i.e., before the L1 'on' command is received) can advantageously allow the WD 22 to put, such as via processing circuitry 84, its PDCCH decoding hardware (e.g., HW 80) in an appropriate sleep state based on X. A larger X value would allow the WD 22 to put its hardware in a state with higher power saving (i.e., by turning off most of the receive (rx) components), while a smaller X would allow a state with relatively smaller power savings. However, as a trade-off, smaller X may allow for faster Scell management. In another alternative, k_offset can be configured for the WD 22 via higher layers (e.g., the k_offset can be indicated via radio resource control (RRC) signalling or MAC CE signalling). The WD 22 may have different k_offset values for different serving cells.

In another example, the L1 command can be included in a PDCCH DCI scheduling PDSCH/PUSCH for the WD 22 for the corresponding Scell. For example, the bits corresponding 'transmit power control (TPC) command for scheduled PUCCH' field in DCI format 1-0 or 1-1, can be used for indicating 'off' L1 command and optionally k_offset.

In some embodiments, the L1 command can also include timer value Ttimer (e.g., a certain number of slots). For example, if the WD 22 receives the L1 command in slot n1, the WD 22 applies the second set of actions starting from slot n1+k_offset and for an amount of time given by the timer value after which the WD 22 stops applying the second set of actions.

In some embodiments, the L1 command can be received by the WD 22, such as via radio interface 82, as a wake-up signal (WUS), or a reference signal (e.g., channel state information reference signal (CSI-RS)) with e.g., a predefined resource/scrambling pattern.

In some cases, the Scell may be configured with one or more bandwidth parts (BWPs). In such cases, separate L1 commands or separate bitfields in a single L1 command can be used to control the second set of actions corresponding to each bandwidth part of the one or bandwidth parts.

The table below, Table 1, illustrates example WD 22 actions on an Scell in response to receiving the higher layer activation/deactivation command and the L1 command.

TABLE 1

Commands and actions.

| State indicated by MAC CE based activation/deactivation command for a Scell | State indicated by L1 on/off command for the Scell | WD actions on the Scell |
| --- | --- | --- |
| 0 | 0 or 1 or not received | Scell deactivated No CSI reporting for the Scell No PDCCH monitoring on/for the Scell No PUCCH/SRS transmission on the Scell |
| 1 | 0 | Scell activated CSI reporting for the Scell |

TABLE 1-continued

Commands and actions.

| State indicated by MAC CE based activation/deactivation command for a Scell | State indicated by L1 on/off command for the Scell | WD actions on the Scell |
| --- | --- | --- |
| | | No PDCCH monitoring on/for the Scell No PUCCH/SRS transmission on the Scell |
| 1 | 1 | Scell activated CSI reporting for the Scell PDCCH monitoring on/for the Scell PUCCH/SRS transmission on the Scell |
| 1 | Not received | Scell activated CSI reporting for the Scell PDCCH monitoring on/for the Scell PUCCH/SRS transmission on the Scell |

Figure 10:
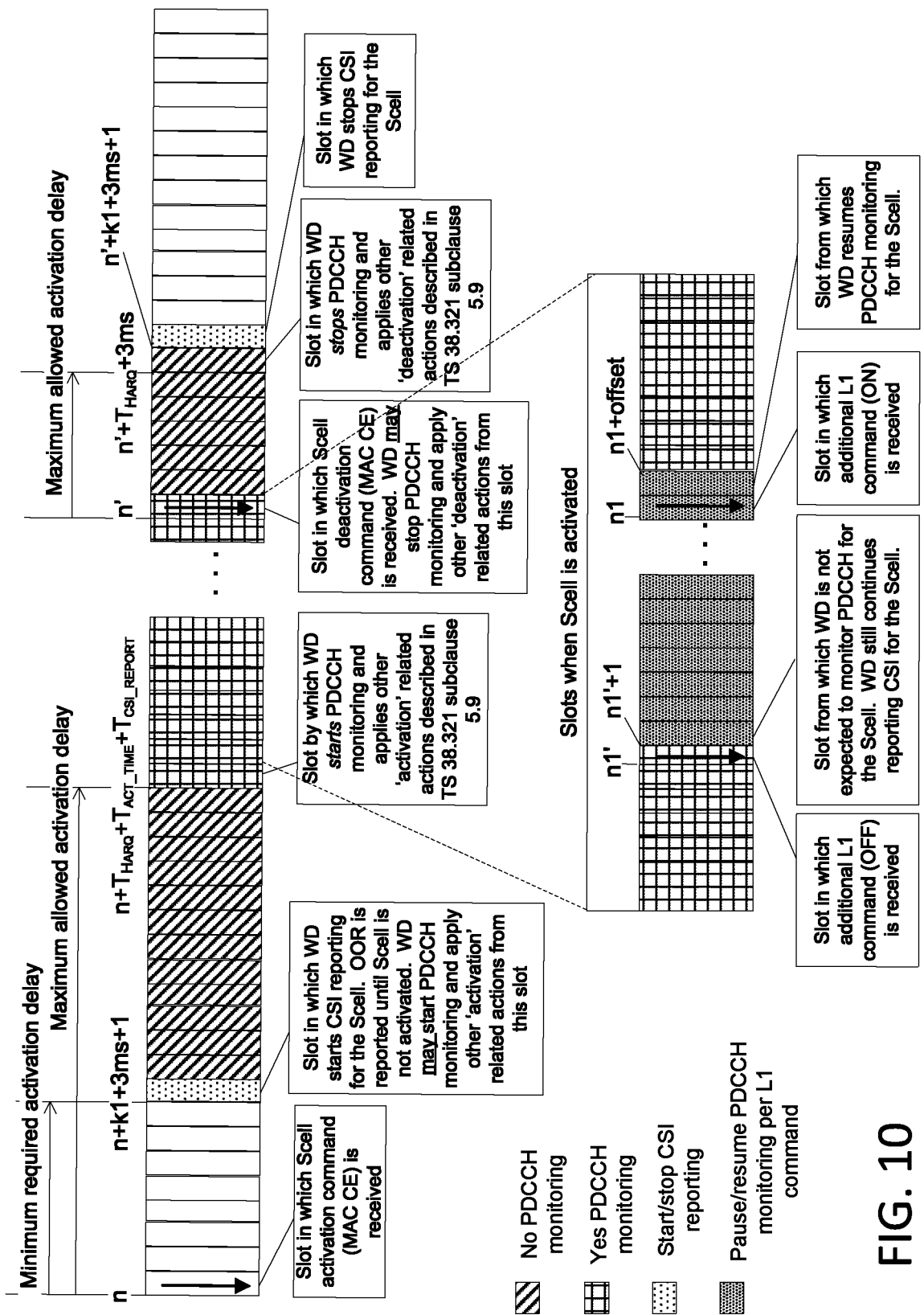
FIG. 10 illustrates an example of one aspect according to some embodiments of the present disclosure.

FIG. 10 illustrates some aspects of the approaches discussed above. With the above approaches, WD 22 actions in response to MAC CE-based activation/deactivation commands can remain the same as in NR Rel-15, which may be represented by the top time slot diagram in FIG. 10. However, as shown for example in the bottom/enlarged time slot diagram section in FIG. 10, some of the 'activation related actions' can be additionally handled via L1 signaling, such as, for example, PDCCH monitoring for the Scell, PUCCH and SRS transmissions by the WD 22 on the Scell can turned on/off by the additional L1 signaling when the Scell is activated. For example, FIG. 10 shows that, in response to the network node 16 sending an additional L1 OFF command, the WD 22 is not expected to monitor PDCCH for the Scell for subsequent slots; and that the WD 22 may resume PDCCH monitoring for the Scell responsive to an L1 ON command from network node 16. In particular, the WD 22 resumes PDCCH monitoring an 'offset' number of slots after receiving the L1 ON command, where the 'offset' number of slots is a fewer number of slots than the number of slots forming the minimum required activation delay between the WD 22 receiving the MAC CE command and the WD starting CSI reporting for the Scell. In some embodiments, CSI reporting for the Scell can only be controlled by MAC CE-based signaling.

In some embodiments, the additional L1 command to turn on/off PDCCH monitoring and PUCCH/SRS transmission on the Scell can be simply specified as a PDCCH command with new RNTI or DCI format specifically used for the purposes described in this disclosure, such as, for example, by using DCI format 0-0 with 1 bit per configured Scell cell indicating L1 on/off for that Scell.

When compared with existing MAC CE based signaling, the techniques described herein can allow for faster control of most Scell-related actions, without requiring extensive changes to existing activation/deactivation-related framework and performance requirements.

With the techniques provided by this disclosure, the WD 22 may be able to respond to the L1 commands much faster (e.g., the next slot from when the command is received) when compared to the response time required for activation/deactivation MAC CEs. This may enable the network 16 to control Scell procedures more aggressively by sending frequent L1 on/off commands, while continuing to use the MAC CE-based activation/deactivation mechanism relatively infrequently (as compared to the frequency of the L1 commands).

From WD 22 perspective, power savings can be achieved with these approaches when compared to the approaches in Rel-15 of the 3GPP specifications. Even though WD 22 power consumption reduction per slot via L1 on/off may be smaller than the reduction obtained by completely deactivating the Scell, because the network (e.g., network node 16) may only rarely deactivate the Scell(s) with the legacy approach, overall power consumption may be considerably smaller with the approach(es) described in this disclosure.

Embodiment 2

In some embodiments, a WD 22 communicates, such as via radio interface 82, with the network (e.g., network node 16) using a primary serving cell (Pcell). The WD 22 may be configured to communicate with one or more secondary serving cells (Scell(s)), such as by the network node 16. The WD 22 may receive a higher layer Scell activation/deactivation command from e.g., the network node 16. Upon reception of the higher layer activation/deactivation command, the WD 22 may start/stop performing, such as via processing circuitry 84, a first set of actions. The first set of actions may include CSI reporting for the Scell. The WD 22 may also receive, such as via radio interface 82, a higher layer (e.g., RRC) message. Depending on the higher layer message, the WD 22 may determine, such as via processing circuitry 84, whether the first set of actions also includes or does not include one or more of the following: a) PDCCH monitoring on for the Scell b), PUCCH transmission on the Scell, c) SRS transmission on the Scell.

In some embodiments, if the WD 22 receives the higher layer activation command in time slot n, the WD 22 applies the first set of actions starting with slot n+D1 (e.g., after an activation delay of D1 slots). The WD 22 may also receive a physical layer command (L1 command). Upon reception of the L1 on/off command, the WD 22 may start/stop performing, such as via processing circuitry 84, a second set of actions. The second set of actions may include PDCCH monitoring for the Scell. The second set of actions may also include transmitting PUCCH/SRS on the Scell. The second set of actions may not include CSI reporting for the Scell. If the WD 22 receives the higher layer activation command in time slot n1, the WD 22 may apply the second set of actions, such as via processing circuitry 84, starting with slot n1+D2 (e.g., after a delay of D2 slots). The delay D2 may be smaller than the delay D1.

In some embodiments, the higher layer Scell activation/deactivation command and the L1 command can be received by the WD 22, such as via radio interface 82, using the approaches/examples described in the previous embodiment (embodiment 1).

The table below, Table 2, illustrates example WD 22 actions on an Scell in response to receiving the higher layer activation/deactivation command and the L1 command.

TABLE 2

Commands and Actions.

| State indicated by MAC CE based activation/ deactivation command for a Scell | State indicated by L1 on/off command for the Scell | WD actions on the Scell |
|---|---|---|
| 0 | 0 or 1 | Scell deactivated<br>No CSI reporting for the Scell<br>No PDCCH monitoring on/for the Scell<br>No PUCCH/SRS transmission on the Scell |
| 1 | 0 | Scell activated<br>CSI reporting for the Scell<br>No PDCCH monitoring on/for the Scell<br>No PUCCH/SRS transmission on the Scell |
| 1 | 1 | Scell activated<br>CSI reporting for the Scell<br>PDCCH monitoring on/for the Scell<br>PUCCH/SRS transmission on the Scell |
| 1 | Not received | Scell activated<br>CSI reporting for the Scell<br>If higher layer (e.g. RRC) message indicates fist state<br>No PDCCH monitoring on/for the Scell<br>No PUCCH/SRS transmission on the Scell<br>Otherwise (e.g., higher layer message indicates second state or the higher layer message is not received)<br>PDCCH monitoring on/for the Scell<br>PUCCH/SRS transmission on the Scell |

In this disclosure, in some embodiments, for a WD 22 configured with CA, turning on/off of various procedures on the Scell(s) is managed by at least two different commands: 1) first higher layer (e.g., MAC CE) based activation/deactivation command based at least in part on which the WD 22 starts/stops a first set of actions including at least CSI reporting for the Scell; and 2) a second L1 command based at least in part on which the WD 22 starts/stops a second set of actions including at least PDCCH monitoring on (and/or for) the Scell. In some embodiments, the second set of actions may not include CSI reporting for the Scell. In some embodiments, the delay used by the WD 22 for applying the second set of actions in response to the L1 command may be configured to be smaller than the delay used by the WD 22 for applying the first set of actions in response to the higher layer command.

Also, what actions belong to the first set (and optionally the second set) can be configured by higher layers (e.g., RRC) by e.g., the network node 16.

In an alternative embodiment, the physical layer signaling (e.g. L1 signaling) can be used in place of the existing higher layer MAC CE signaling.

In this alternative embodiment, the cell indices of the Scells to be activated are embedded in the DCI of a PDCCH L1 activation command. That is, the WD 22 can receive the L1 activation command from the network node 16. If the WD 22 is configured to monitor the PDCCH for this L1 activation command—for example by being configured to monitor a specific DCI format and/or RNTI specified for the activation command—the WD 22 activates the Scells indicated in the DCI based on the command.

In one example implementation of this embodiment, if the WD 22 receives the L1 activation command for an Scell from the network node 16 in slot 'n', the WD starts PDCCH monitoring for the Scell from slot n+1. The WD 22 may also start CSI reporting for the Scell from slot n+1.

In another example implementation, the WD 22 sends an acknowledgement ('ACK') corresponding to the L1 command in slot 'n+k1' in response to receiving the L1 command in slot 'n'. The WD 22 may then proceed to begin PDCCH monitoring for the Scell in slot 'n+k1+1'. The WD 22 might also begin CSI reporting for the Scell from slot n+k1+1. The value of the offset k1 may vary with implementation, but in one example k1=4.

Figure 11:
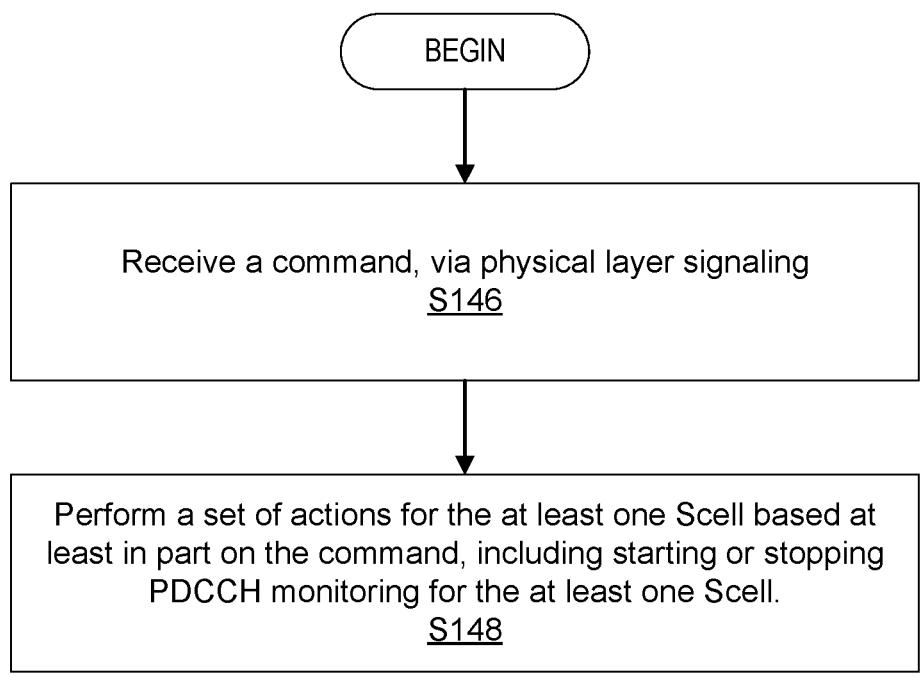
FIG. 11 is a flowchart of a process in a wireless device according to a summary of the embodiments of the present disclosure.

A summary of the methods performed by the WD 22 according to embodiments of the present disclosure is shown in FIG. 11.

At step S146, the WD 22 receives a command via physical layer signaling. At step S148 the WD 22 performs a set of actions for the at least one Scell based on the command that include starting or stopping PDCCH monitoring for the Scell.

The command can be received via PDCCH signaling. It can be received in DCI. It can be an L1 command, for example an L1 activation command. In accordance with some examples, for example those described with respect to FIG. 9, the WD 22 may also receive a command via higher layer signaling, e.g. MAC layer signaling. That command can cause the WD 22 to perform a set of actions different from the set of actions performed in response to receiving the physical layer command, for example starting or stopping CSI reporting.

Figure 12:
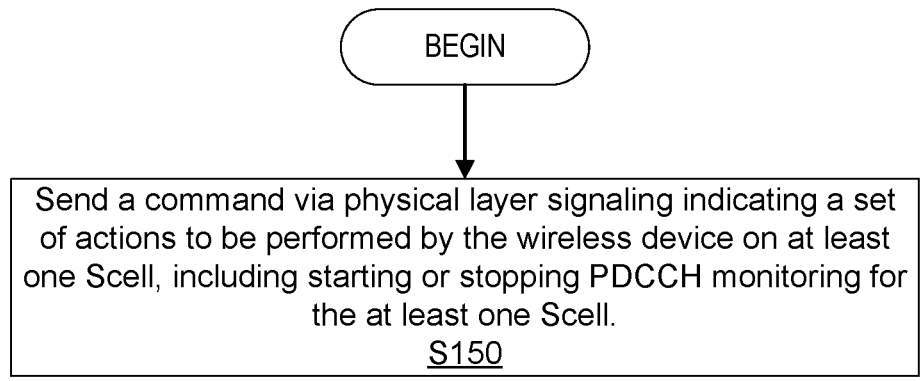
FIG. 12 is a flowchart of a process in a network node according to a summary of the embodiments of the present disclosure.

A summary of the methods performed by the network node 16 according to embodiments of the present disclosure is shown in FIG. 12. At step S150 the network node 16 sends a command via physical layer signaling indicating a set of actions to be performed by the WD 22. The set of actions includes starting or stopping PDCCH monitoring for the at least one Scell. The command can be sent via PDCCH signaling. It can be sent in DCI. It can be an L1 command, for example an L1 activation command. In some examples, for example those described with reference to FIG. 8, the network node 16 additionally sends a command via higher layer signaling for example MAC layer signaling. That command can cause the WD 22 to perform a set of actions different from the set of actions performed in response to receiving the physical layer command, for example starting or stopping CSI reporting.

Some example embodiments may include one or more of the following:

Embodiment A1. A network node 16 configured to communicate with a wireless device 22 (WD 22), the network node 16 configured to, and/or comprising a radio interface 62 and/or comprising processing circuitry 68 configured to:

send, via higher layer signaling, a first command, the first command being an activation/deactivation command for at least one secondary cell (Scell); and determine and send, via layer 1 signalling, a second command, the second command being different from the first command and the second command indicating at least one action to be performed by the WD 22 for the at least one Scell.

Embodiment A2. The network node 16 of Embodiment A1, wherein:

the first command is configured to command the WD 22 to start/stop at least one of a first set of actions; and the second command is configured to command the WD 22 to start/stop at least one of a second set of actions, the second set of actions being different from the first set of actions.

Embodiment A3. The network node 16 of Embodiment A2, wherein one or more of:

the first set of actions includes channel state information (CSI) reporting for the at least one Scell;

the second set of actions does not include CSI reporting for the at least one Scell; and one or both of the first and second set of actions includes one or more of: physical downlink control channel (PDCCH) monitoring for the at least one Scell, physical uplink control channel (PUCCH) transmission on the at least one Scell, and sounding reference signal (SRS) transmission on the at least one Scell.

Embodiment A4. The network node 16 of Embodiment A1, wherein one or more of:

the second command is sent on a physical downlink control channel;

the second command is sent in downlink control information (DCI); and the second command includes at least one of an on/off status, an activate/deactivate field, an offset and a timer value, for each of the at least one Scell.

Embodiment B1. A method implemented in a network node, the method comprising:

sending, via higher layer signaling, a first command, the first command being an activation/deactivation command for at least one secondary cell (Scell); and determining and sending, via layer 1 signalling, a second command, the second command being different from the first command and the second command indicating at least one action to be performed by the WD 22 for the at least one Scell.

Embodiment B2. The method of Embodiment B1, wherein:

the first command is configured to command the WD 22 to start/stop at least one of a first set of actions; and the second command is configured to command the WD 22 to start/stop at least one of a second set of actions, the second set of actions being different from the first set of actions.

Embodiment B3. The method of Embodiment B2, wherein one or more of:

the first set of actions includes channel state information (CSI) reporting for the at least one Scell;

the second set of actions does not include CSI reporting for the at least one Scell; and one or both of the first and second set of actions includes one or more of: physical downlink control channel (PDCCH) monitoring for the at least one Scell, physical uplink control channel (PUCCH) transmission on the at least one Scell, and sounding reference signal (SRS) transmission on the at least one Scell.

Embodiment B4. The method of Embodiment B1, wherein one or more of:

the second command is sent on a physical downlink control channel;

the second command is sent in downlink control information (DCI); and the second command includes at least one of an on/off status, an activate/deactivate field, an offset and a timer value, for each of the at least one Scell.

Embodiment C1. A wireless device 22 (WD 22) configured to communicate with a network node 16, the WD 22 configured to, and/or comprising a radio interface 82 and/or processing circuitry 84 configured to:
  receive, via higher layer signaling, a first command, the first command being an activation/deactivation command for at least one secondary cell (Scell);
  receive, via layer 1 signalling, a second command, the second command being different from the first command; and
  perform at least one action associated with the at least one Scell based at least in part on the second command.

Embodiment C2. The WD 22 of Embodiment C1, wherein the processing circuitry 84 is further configured to:
  start/stop at least one of a first set of actions based at least in part on the first command; and
  start/stop at least one of a second set of actions based at least in part on the second command, the second set of actions being different from the first set of actions.

Embodiment C3. The WD 22 of Embodiment C2, wherein one or more of:
  the first set of actions includes channel state information (CSI) reporting for the at least one Scell;
  the second set of actions does not include CSI reporting for the at least one Scell; and
  one or both of the first and second set of actions includes one or more of: physical downlink control channel (PDCCH) monitoring for the at least one Scell, physical uplink control channel (PUCCH) transmission on the at least one Scell, and sounding reference signal (SRS) transmission on the at least one Scell.

Embodiment C4. The WD 22 of Embodiment C1, wherein one or more of:
  the second command is received on a physical downlink control channel;
  the second command is included in downlink control information (DCI); and
  the second command includes at least one of an on/off status, an activate/deactivate field, an offset and a timer value, for each of the at least one Scell.

Embodiment D1. A method implemented in a wireless device 22 (WD 22), the method comprising:
  receiving, via higher layer signaling, a first command, the first command being an activation/deactivation command for at least one secondary cell (Scell);
  receiving, via layer 1 signalling, a second command, the second command being different from the first command; and
  performing at least one action associated with the at least one Scell based at least in part on the second command.

Embodiment D2. The method of Embodiment D1, further comprising:
  starting/stopping at least one of a first set of actions based at least in part on the first command; and
  starting/stopping at least one of a second set of actions based at least in part on the second command, the second set of actions being different from the first set of actions.

Embodiment D3. The method of Embodiment D2, wherein one or more of:
  the first set of actions includes channel state information (CSI) reporting for the at least one Scell;
  the second set of actions does not include CSI reporting for the at least one Scell; and
  one or both of the first and second set of actions includes one or more of: physical downlink control channel (PDCCH) monitoring for the at least one Scell, physical uplink control channel (PUCCH) transmission on the at least one Scell, and sounding reference signal (SRS) transmission on the at least one Scell.

Embodiment D4. The method of Embodiment D1, wherein one or more of:
  the second command is received on a physical downlink control channel;
  the second command is included in downlink control information (DCI); and
  the second command includes at least one of an on/off status, an activate/deactivate field, an offset and a timer value, for each of the at least one Scell.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| CDM | Code Division Multiplex |
| CQI | Channel Quality Information |
| CRC | Cyclic Redundancy Check |
| CSI-RS | Channel State Information Reference Signal |
| DC | Dual-connectivity |
| DCI | Downlink Control Information |
| DFT | Discrete Fourier Transform |
| DM-RS | Demodulation Reference Signal |
| EIRP | Effective Isotropic Radiated Power |
| FDM | Frequency Division Multiplex |
| HARQ | Hybrid Automatic Repeat Request |
| OFDM | Orthogonal Frequency Division Multiplex |
| PAPR | Peak to Average Power Ratio |
| PBCH | Primary Broadcast Channel |
| PRACH | Physical Random Access Channel |
| PRB | Physical Resource Block |
| PUCCH | Physical Uplink Control Channel |
| PUSCH | Physical Uplink Shared Channel |
| RRC | Radio Resource Control |
| SRS | Sounding Reference Signal |
| SS-block | Synchronization Signal Block |
| UCI | Uplink Control Information |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented at a wireless device (WD) configured to operate on one or more secondary cells (Scells), the method comprising:
   receiving an activation/deactivation command via Medium Access Control (MAC) layer signaling;
   performing a set of actions for at least one Scell of the one or more Scells upon receiving the command via MAC layer signaling, the set of actions performed upon receiving the command via MAC layer signaling including starting or stopping sounding reference signal (SRS) transmission on the at least one Scell, starting or stopping channel state information (CSI) reporting for the at least one Scell and starting and stopping physical downlink control channel (PDCCH) monitoring for the at least one Scell;
   receiving a command via PDCCH signaling; and
   performing a set of actions for the at least one Scell in response to receiving the command via the PDCCH signaling, the set of actions including stopping PDCCH monitoring for the at least one Scell and stopping SRS transmission on the at least one Scell.

2. The method of claim 1, wherein the set of actions performed in response to receiving the command via the PDCCH signaling excludes starting or stopping CSI reporting for the at least one Scell.

3. The method of claim 1, wherein the method comprises receiving the command via PDCCH signaling in downlink control information (DCI) on a primary cell (Pcell).

4. The method of claim 3, wherein receiving the command via PDCCH signaling further comprises:
   receiving N bits in DCI of the PDCCH on the Pcell, each bit of the N bits corresponding to a respective Scell of the one or more Scells, each bit of the N bits indicating an on state or an off state for the respective Scell of the one or more Scells configured for the WD.

5. The method of claim 1, wherein:
   performing the set of actions upon receiving the command via MAC layer signaling further comprises performing those actions after a first delay, D1, from when the command is received; and
   performing the set of actions upon receiving the command via PDCCH signaling further comprises performing those actions after a second delay, D2, from when the command is received, the second delay being smaller than the first delay.

6. The method of claim 1, wherein receiving the command via PDCCH signaling comprises receiving that command as a wake-up signal.

7. The method of claim 1, further comprising:
   determining whether to report CSI for the at least one Scell based at least in part on a state indicated by the command received via MAC layer signaling and regardless of a state indicated by the command received via PDCCH signaling.

8. A method implemented in a network node configured to configure a wireless device (WD) to operate on one or more secondary cells (Scells), the method comprising:
   sending a command, via a physical downlink control channel (PDCCH) signaling indicating a set of actions to be performed by the WD on at least one Scell of the one or more Scells, the set of actions including starting or stopping PDCCH monitoring for the at least one Scell, and stopping sounding reference signal (SRS) transmission for the at least one Scell; and
   sending an activation/deactivation command via Medium Access Control (MAC) layer signaling indicating a set of actions for at least one Scell of the one or more Scells, the set of actions indicated by the activation/deactivation command sent via MAC layer signaling including starting or stopping SRS transmission on the at least one Scell, starting or stopping channel state information (CSI) reporting for the at least one Scell and starting and stopping PDCCH monitoring for the at least one Scell.

9. The method of claim 8, wherein the set of actions performed in response to receiving the command via the PDCCH signaling excludes deactivating the at least one SCell.

10. The method of claim 8, wherein the method comprises sending the command via PDCCH signaling in downlink control information (DCI) on a primary cell (Pcell).

11. The method of claim 10, wherein sending the command via PDCCH signaling further comprises:
sending N bits in DCI of the PDCCH on the Pcell, each bit of the N bits corresponding to a respective Scell of the one or more Scells, N being a number of the one or more Scells, each bit of the N bits indicating an on state or an off state for the respective Scell of the one or more Scells.

12. The method of claim 8, wherein:
the set of actions indicated by the command sent via MAC layer signaling is to be performed by the WD after a first delay, D1, from when the command is received by the WD; and
the set of actions indicated by the command sent via PDCCH signaling is to be performed by the WD after a second delay, D2, from when the command is received by the WD, the second delay being smaller than the first delay.

13. The method of claim 8, wherein sending the command via PDCCH signaling comprises sending the command as a wake-up signal.

14. The method of claim 8, wherein a state indicated by the command sent via MAC layer signaling indicates whether the WD is to report CSI for the at least one Scell, regardless of a state indicated by the command sent via PDCCH signaling.

15. The method of claim 8, further comprising:
receiving signaling on the at least one Scell based at least in part on at least one of the command received via MAC layer signaling and the command received via PDCCH signaling.

16. A wireless device (WD) configured to operate on one or more secondary cells (Scells), the WD configured to:
receive an activation/deactivation command via Medium Access Control (MAC) layer signaling;
perform a set of actions for at least one Scell of the one or more Scells upon receiving the command via MAC layer signaling, the set of actions to be performed upon receiving the command via MAC layer signaling including starting or stopping sounding reference signal (SRS) transmission on the at least one Scell, starting or stopping channel state information (CSI) reporting for the at least one Scell and starting and stopping physical downlink control channel (PDCCH) monitoring for the at least one Scell; and
receive a command via PDCCH signaling; and
perform a set of actions for the at least one Scell of the one or more Scells upon receiving the command via PDCCH signaling, the set of actions including stopping PDCCH monitoring for the at least one Scell and stopping SRS transmission for the at least one Scell.

17. The WD of claim 16, wherein the set of actions performed in response to receiving the command via the PDCCH signaling excludes starting or stopping CSI reporting for the at least one SCell.

18. The WD of claim 16, wherein the WD is configured to receive the command via PDCCH signaling in downlink control information (DCI) on a primary cell (Pcell).

19. The WD of claim 18, wherein the WD is further configured to:
receive N bits in DCI of the PDCCH on the Pcell, each bit of the N bits corresponding to a respective Scell of the one or more Scells, each bit of the N bits indicating an on state or an off state for the respective Scell of the one or more Scells configured for the WD.

20. The WD of claim 16, wherein the WD is configured to:
perform the set of actions upon receiving the command via MAC layer signaling by performing those actions after a first delay, D1, from when the command is received; and
perform the set of actions upon receiving the command via PDCCH signaling by performing the those actions after a second delay, D2, from when the command is received, the second delay being smaller than the first delay.

21. The WD of claim 16, wherein the WD is further configured to receive the command via PDCCH signaling as a wake-up signal.

22. The WD of claim 16, wherein the WD is further configured to:
determine whether to report CSI for the at least one Scell based at least in part on a state indicated by the command received via MAC layer signaling and regardless of a state indicated by the command received via PDCCH signaling.

23. A network node configured to configure a wireless device (WD) to operate on one or more secondary cells (Scells), the network node configured to:
send a command via a physical downlink control channel (PDCCH) signaling indicating a set of actions to be performed by the WD on at least one Scell of the one or more Scells, the set of actions including starting or stopping PDCCH monitoring for the at least one Scell, and stopping sounding reference signal (SRS) transmission for the at least one Scell; and
send an activation/deactivation command via Medium Access Control (MAC) layer signaling indicating a set of actions for the at least one SCell of the one or more Scells, the set of actions indicated by the activation/deactivation command sent via MAC layer signaling including starting or stopping SRS transmission on the at least one Scell, starting or stopping channel state information (CSI) reporting for the at least one Scell and starting and stopping PDCCH monitoring for the at least one Scell.

24. The method of claim 1, wherein the one or more Scells includes a plurality of Scells.

25. The method of claim 8, wherein the one or more Scells includes a plurality of Scells.

* * * * *

UNITED STATES PATENT AND TRADEMARK OFFICE
CERTIFICATE OF CORRECTION

PATENT NO. : 12,082,210 B2  
APPLICATION NO. : 17/421900  
DATED : September 3, 2024  
INVENTOR(S) : Ravikiran Nory and Ajit Nimbalker Page 1 of 1

It is certified that error appears in the above-identified patent and that said Letters Patent is hereby corrected as shown below:

In the Claims

In Column 30, Line 14, Claim 1 delete "starting and stopping" and insert -- starting or stopping --, therefor.

In Column 31, Line 6, Claim 8 delete "starting and stopping" and insert -- starting or stopping --, therefor.

In Column 31, Line 57, Claim 16 delete "starting and stopping" and insert -- starting or stopping --, therefor.

In Column 32, Line 56, Claim 23 delete "starting and stopping" and insert -- starting or stopping --, therefor.

Signed and Sealed this  
Fourth Day of February, 2025

Coke Morgan Stewart  
*Acting Director of the United States Patent and Trademark Office*